United States Patent
Elliott et al.

(10) Patent No.: US 6,828,961 B2
(45) Date of Patent: Dec. 7, 2004

(54) COLOR WHEEL SYNCHRONIZATION IN MULTI-FRAME-RATE DISPLAY SYSTEMS

(75) Inventors: Keith H. Elliott, Plano, TX (US); Kazuhiro Ohara, Allen, TX (US); William B. Werner, Plano, TX (US); Adam J. Kunzman, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 389 days.

(21) Appl. No.: 09/750,829

(22) Filed: Dec. 28, 2000

(65) Prior Publication Data

US 2002/0054031 A1 May 9, 2002

Related U.S. Application Data

(60) Provisional application No. 60/173,858, filed on Dec. 30, 1999.

(51) Int. Cl.[7] .................................................. G09G 5/00
(52) U.S. Cl. ........................ 345/213; 345/88; 345/691; 345/32; 348/743
(58) Field of Search ........................ 345/88, 213, 204, 345/690, 691, 55, 32; 348/742, 743; 318/807, 811

(56) References Cited

U.S. PATENT DOCUMENTS

| | | | |
|---|---|---|---|
| 5,032,913 A | * | 7/1991 | Hattori et al. ................ 348/70 |
| 5,625,424 A | | 4/1997 | Conner et al. |
| 5,691,780 A | | 11/1997 | Marshall et al. |
| 5,774,196 A | | 6/1998 | Marshall |
| 5,784,038 A | * | 7/1998 | Irwin .......................... 345/88 |
| 5,880,573 A | | 3/1999 | Marshall et al. |
| 6,002,452 A | | 12/1999 | Morgan |
| 6,005,722 A | * | 12/1999 | Butterworth et al. ........ 359/712 |
| 6,054,832 A | | 4/2000 | Kunzman et al. |
| 6,084,235 A | | 7/2000 | Breithaupt et al. |
| 6,545,265 B1 | * | 4/2003 | Czarnetzki et al. ......... 250/234 |

OTHER PUBLICATIONS

U.S. patent application Ser. No. 09/745,906, Ohara et al., filed Dec. 21, 2000.

* cited by examiner

*Primary Examiner*—Amr Awad
(74) *Attorney, Agent, or Firm*—Charles A. Brill; Wade James Brady, III; Frederick J. Telecky, Jr.

(57) ABSTRACT

A display system (200) in which light from source (202) is focused onto a spinning color wheel (204). The spinning color wheel (204) spins at a constant rate and creates of beam of light that changes from one primary color to the next in rapid sequence. The primary colored beam of light impinges a spatial light modulator (206), which is often a DMD or LCD. A controller (208) receives an input video signal and determines the native frame rate of the image source. The controller (208) sends image data to the spatial light modulator (206) in synchronization with the color wheel (204)—image data representing the red portions of the image is sent during the period in which the red color filter is passing through the beam of light—at the native frame rate of the image source. The modulated light is focused onto an image plane (210) by projection lens (212) to form an image. The eye of the viewer integrates the sequential primary color images giving the perception of a single full-color image. The display system uses a single nominal color wheel speed to display input signals having various native frame rates. The nominal color wheel speed is selected to allow the same color wheel rate to be used for a variety of native frame rates. The color wheel speed is selected to provide a sub-frame rate that is an integer multiple the native frame rate of each potential input format.

21 Claims, 3 Drawing Sheets

COLOR WHEEL SYNCHRONIZATION IN MULTI-FRAME-RATE DISPLAY SYSTEMS

This application claims priority under 35 USC §119(e)(1) of provisional application No. 60/173,858 filed Dec. 30, 1999.

FIELD OF THE INVENTION

This invention relates to the field of display systems that receive input signals having multiple frame rates, more particularly to sequential color display systems that use a white light source in combination with a sequential filter such as a color wheel to produce a full color image.

BACKGROUND OF THE INVENTION

Many projection display systems use a single light modulator in combination with a white light source to produce a full color image. In order to produce a full color image, the white light source is filtered sequentially to produce a primary colored light beam that changes over time. Typically, a color wheel is used to allow a series of primary colored filters to be spun through the white light beam in rapid succession. As each filter passes through the light beam, the light beam becomes a primary color beam with the active primary color determined by which portion of the color wheel is passing through the optical path.

During each primary color period, data for the appropriate color is provided to a spatial light modulator to enable the modulator to create a series of single color images. If the single color images are created in a rapid sequence, the viewer's eye integrates the series of images to give the perception of viewing a single full-color image.

Because the data that must be written to the modulator depends on the position of the color wheel, the position of the color wheel is tightly controlled to synchronize the color wheel with the remainder of the display system. The transition period between adjacent color filters—typically called a spoke period—requires turning the modulator off to ensure only pure primary colored light is used to create each of the three primary colored image. Uncertainties and errors in the position or speed of the color wheel force the display system controller to lengthen the spoke periods to ensure only primary colored light is incident the modulator at the appropriate time. Unfortunately, the accumulated off time associated with the lengthened spoke periods creates a substantial drop in projector efficiency.

Another issue associated with the use of a color wheel is the need to synchronize the color wheel with the frame rate of the input video signal. This synchronization can take several seconds when a small color wheel motor is used. Small color wheel motors do not have the torque required to rapidly change the speed of the color wheel. Large color wheel motors respond to speed changes quicker, but cost more, draw more current, and take up more space in the display system.

The input video frame rate depends on the format of the input video signal. In the United States, standard television broadcast signals provide interlaced fields at a 60 Hz field rate—or a 30 Hz frame rate. Unless the context requires otherwise, for the purposes of this disclosure the term frame rate will be used to indicate either a frame rate or a field rate. Progressive-scanned images, which are de-interlaced, typically have a 60 Hz frame rate. Images from film typically have a 24 Hz frame rate. The frame rate of computer graphics varies between 45 Hz and 75 Hz.

Even though standard television is broadcast at 60 Hz, much of the broadcast content originated on film, which typically is shot at 24 Hz. Not only were movies that originally showed in theaters originally captured on film, much of the prime-time made for TV content was also filmed. Film is used since directors are familiar with it as a media.

After the content is captured on film, the film is converted to an interlaced 60 Hz video signal through a process called 3-2 pull-down. As shown in FIG. 1, the 3-2 pull-down process creates two video fields from the first film frame, three video fields from the second frame, two video fields from the third frame, three video fields from the fourth frame, and so on. The result of 3-2 pull-down is a series of images at the correct field and frame rate for broadcast at 60 Hz.

The 3-2 pull-down process is necessary in CRT-based display systems because the 24 Hz frame rate of the source material is too slow to avoid flicker. Some display systems, such as DMD-based displays, could display the slow frame rate image without creating flicker. While CRT-based display systems excite a phosphor once per frame, after which the phosphor gradually decays, DMD-based display systems using pulse width modulation continue to illuminate a pixel at intervals throughout the duration of the entire frame.

Unfortunately, 3-2 pull-down creates an artifact known as the 3-2 shuffle. The artifact is due to the fact that smooth motion in the original scene becomes erratic motion in the video data sequence. Typically each field of a video sequence represents the scene at a time $\frac{1}{60}$ of a second after the previous field and $\frac{1}{60}$ of a second before the next field. As shown in FIG. 1, 3-2 pull-down results in both fields of the first video frame representing the image at the same point in time. The two fields of the second video frame both represent the image at the same point in time, $\frac{1}{24}$ of a second after the first two fields. The third video frame is a composite of image data from video frame 2 and image data captured $\frac{1}{24}$ of a second late. The same is true of the fourth video frame which is a composite of information taken at the time of the last half of frame three and $\frac{1}{24}$ second later. Finally, the fifth video frame, like the first two, is comprised of two fields of data taken at the same point in time.

The higher frame rate that results from the 3-2 pull-down operation limits the bit depth DMD-based systems are able to display and limits the amount of time the DMD-based systems can spend on artifact mitigation techniques such as spatial-temporal multiplexing. Consequently, in order to project the best image possible, DMD-based systems detect 3-2 pull-down and decode the image signal to recreate the 24 Hz frame rate, or use a 24 Hz proscan input directly.

While the color wheel can synchronize with either a 24 Hz or 60 Hz input signal, as well as many other frequencies, switching between sources of different frame rates results in an intolerable delay while the color wheel changes speed and resynchronizes with the new input signal. What is needed is a method and system for eliminating or greatly reducing the delay necessitated by the resynchronization operation.

SUMMARY OF THE INVENTION

Objects and advantages will be obvious, and will in part appear hereinafter and will be accomplished by the present invention which provides a display system comprising a light source for producing a beam of white light along a first light path, a filter wheel on the first light path for filtering the beam of white light, the filter wheel having at least one set of primary colored filters thereon, a motor connected to the filter wheel for spinning the filter wheel at a nominal speed, a spatial light modulator on the first light path for receiving the filtered beam of light traveling along the first path and selectively modulating the filtered beam of light traveling along the first path to form an image, and a controller receiving an input video signal at a video frame rate and providing image data decoded from the input video signal to the spatial light modulator. The input video signal has one of at least two native frame rates. The controller detects the native frame rate and converts the input video signal to the native frame rate and displays said decoded image data at the native frame rate.

According to a second embodiment, a method of operating a sequential color display system is disclosed. The method comprises the steps of spinning a color wheel at a nominal speed, receiving an input video signal, detecting a native frame rate of the input video signal, converting the input video signal to the native frame rate, displaying the input video signal at the native frame rate using the color wheel spinning at a nominal speed.

The disclosed invention provides the technical advantage of providing for a rapid change between input signals having various frame rates. A further technical advantage is the simplification of the color wheel speed controller since the color wheel is operated at a constant speed. Yet another technical advantage is the ability to perform additional image processing on signals that are detected as having a low native frame rate. By displaying an image signal at a native frame rate lower than the frame rate at which the signal is broadcast, additional processing and display time is available to use for artifact mitigation.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new color wheel speed control method and system has been developed. The new system spins the color wheel at a constant speed regardless of whether the input video source is a standard 60 Hz broadcast, a 30 Hz or 24 Hz proscan broadcast, or a 60 Hz broadcast of a 24 Hz source. If the broadcast is from a 24 Hz source, the signal is processed to restore the frame rate to 24 Hz and the restored signal is displayed. Displaying the 24 Hz video signal at the lower frame rate simplifies the data decoding circuitry and allows more time for the display to implement image improvement and artifact mitigation algorithms. Because the color wheel motor does not change speed except to regain phase lock on a new signal, the new method and system enable very rapid channel changes, even between video sources of different frame rates. Furthermore, using a common color wheel speed enables the use of an inexpensive low torque motor—reducing not only the cost of the display system but also the power required to operate the color wheel motor and the noise created by the color wheel motor.

Figure 1:
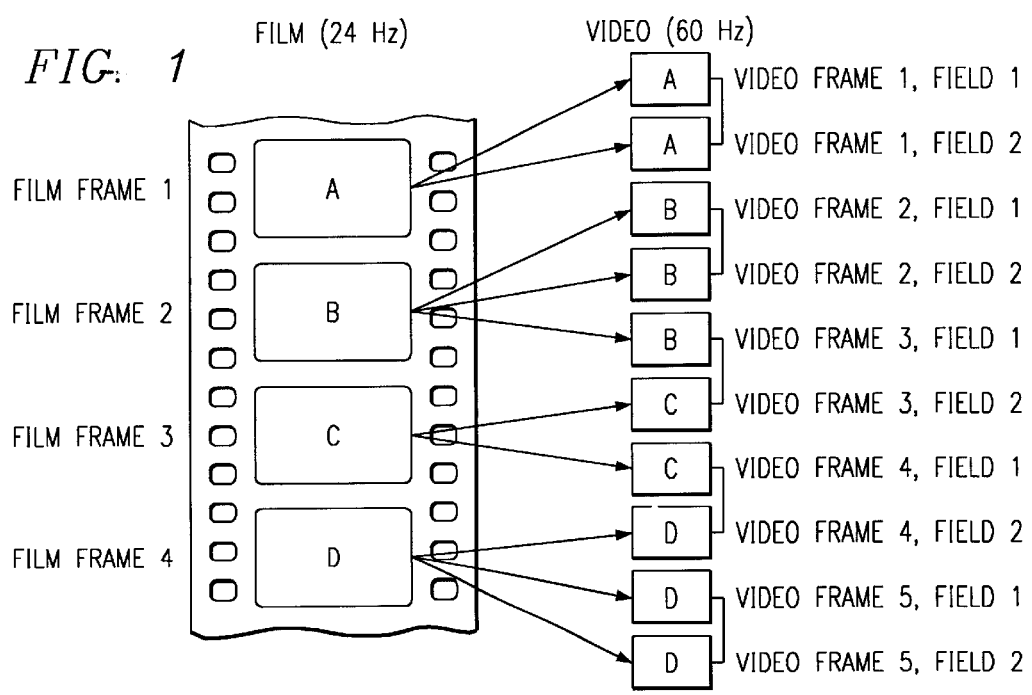
FIG. 1 is a schematic representation of the 3-2 pull-down process used to convert 24 Hz film to 60 Hz video.
Figure 2:
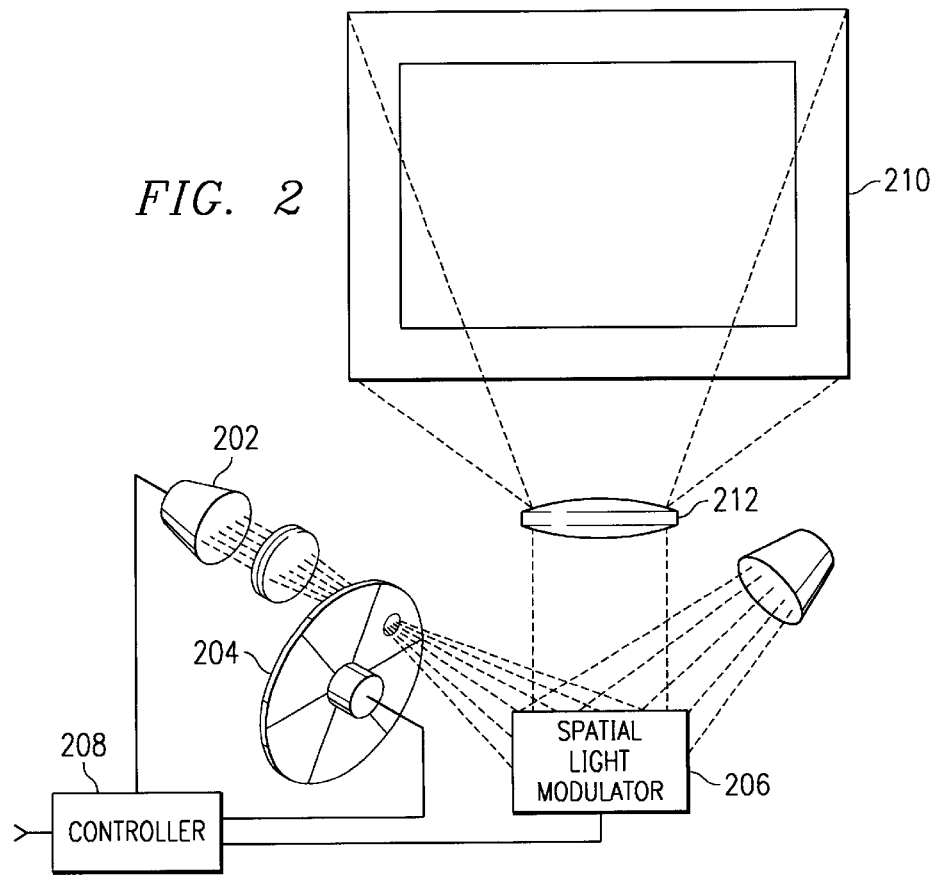
FIG. 2 sequential color display system using the common color wheel speed system of the present invention.

FIG. 2 is a perspective view of a sequential color display system 200. In the display system 200 of FIG. 2, light from source 202 is focused onto a spinning color wheel 204. The spinning color wheel 204 creates of beam of light that changes from one primary color to the next in rapid sequence. The primary colored beam of light impinges a spatial light modulator 206, in this case a DMD.

A controller 208 receives a video signal and sends image data to the spatial light modulator 206 in synchronization with the color wheel 204. Image data representing the red portions of the image is sent during the period in which the red color filter is passing through the beam of light. The modulated red beam of light is focused onto an image plane 210 by projection lens 212 to form a red image. The process repeats as the green and blue filters pass through the path of the light beam. The eye of the viewer integrates the three primary color images giving the perception of a single full-color image.

In order to accomplish the synchronization between the color wheel 204 and the image data, the display system controller 208 provides the motor spinning the color wheel 204 with speed commands and receives positional information from the color wheel 204. As will be discussed in detail below, a novel feature of the display system of FIG. 2 is the use of a common nominal color wheel speed for display of both 60 Hz and 24 Hz video signals. The ability to display 24 Hz signals without necessitating a change in color wheel speed enables the display system seamlessly to detect 3-2 pull-down source material, and reconvert it to its native 24 Hz, and display the images at a 24 Hz frame rate. According to the invention taught herein, the nominal color wheel speed is selected to allow the same color wheel rate to be used for both 60 Hz and 24 Hz material. The same concepts are applicable to European television formats which implement a 50 Hz progressive scan display.

As described above, sequential color display systems produce full color images by creating a sequence of primary colored images. Existing digital micromirror device (DMDTM) based display systems provide a plurality of images of each primary color, or color sub-frames, during a given frame period. Using multiple color sub-frames avoids the creation of motion artifacts, called color separation artifacts, which can be generated when each frame is comprised of only a single sub-frame of each primary color. Most people cannot see the color separation artifacts when the number of sub-frames of each primary color per frame exceeds about 4.5.

To generate the color sub-frames, a color wheel with a single set of color filters can be spun at a rate several times higher than the frame rate, or multiple sets of color filters can be put on the same color wheel. The faster the color wheel spins, the more noise is created by the movement of the wheel through the air and the faster the bearings of the color wheel wear out. A good compromise uses the color wheel shown in FIG. 3.

Figure 3:
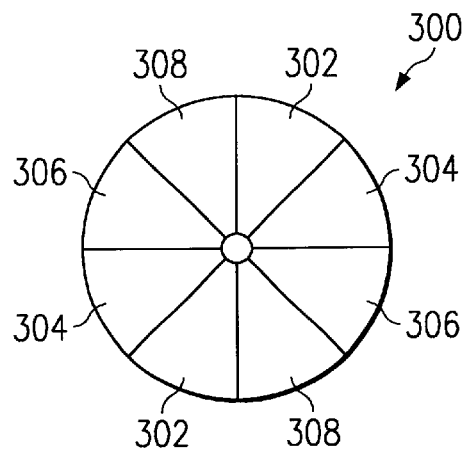
FIG. 3 is a plan view of a color wheel suitable for use with the disclosed common color wheel speed system.

The color wheel 300 of FIG. 3 includes two complete sets of color filters. Each set of filters includes a red 302, green 304, blue 306, and clear 308 filter segment. The clear segment 308 is used to boost the brightness of the display. The segments do not have to be the same size, and typically the clear segment 308 is smaller than the other segments.

Referring back to FIG. 2, according to one embodiment of the disclosed invention, the color wheel 204 spins at a nominal frequency regardless of the format of the input signal. The controller 208 receives the input video signal and detects the frame rate of the source of the images. If the input video signal frame rate is different than the frame rate of the source of the images, the controller 208 converts the input video signal to the native frame rate of the image source. For example, if the controller receives a 60 Hz video signal that was created using a 24 Hz film source and 3-2 pull-down the controller decodes the 60 Hz video signal to recreate the 24 Hz image source. The controller 208 determines the number of sub-frames during which to display each frame of the source image and drives the modulator 206 with the image data.

Figure 4:
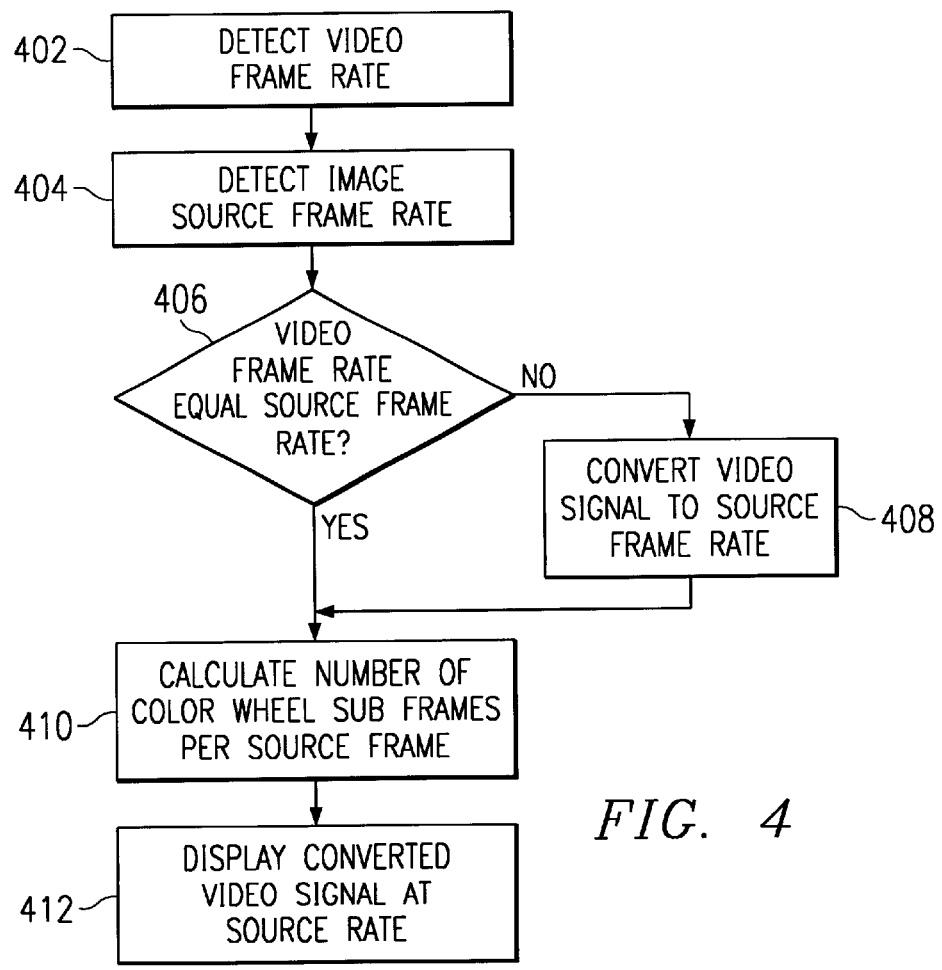
FIG. 4 is a flow chart showing the steps taken by the controller of FIG. 2 to display multiple frame rate images using a common speed color wheel.

FIG. 4 is a flow chart showing the operations performed by the display system of FIG. 2. In block 402, the frame rate of an input video source is detected, typically by counting the period between vertical synchronization signals. In block 402, the native frame rate of the image source used to create the input video signal is determined. As described above, this requires analyzing the input video signal to detect whether the input video signal has been converted from an image source having a different frame rate. Typically this involves receiving a 60 Hz broadcast input video signal and comparing image data from adjacent frames to determine if the frame rate of the video signal has been altered. For example, if no motion is detected between the pairs of fields making up each frame of the signal, the source was likely film shot at 30 frames per second and the video signal has been converted by splitting the frame into interlaced fields. Likewise, if the pattern of identical fields indicated 3-2 pull-down is detected, the source was likely film shot at 24 frames per second.

If the video frame rate of the received input signal and the calculated source frame rate are not equal, as tested in block 406, the input video signal is converted to its native frame rate, typically either 60, 30, or 24 Hz in block 408. In block 410, the controller uses the native frame rate of the image source, the speed of the color wheel, and the number of sets of filter segments on the color wheel to determine the number of color sub-frames to allocate to a source frame. The video data is then displayed at its native frame rate in block 412.

Figure 5:
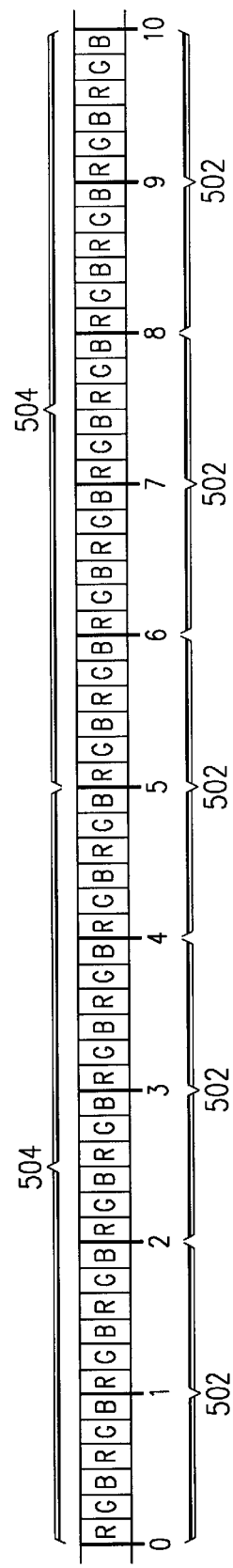
FIG. 5 is a timeline showing the relationship between a 24 Hz frame sequence and a 60 Hz frame sequence using a common 120 Hz color wheel speed according to the present invention.
Figure 6:
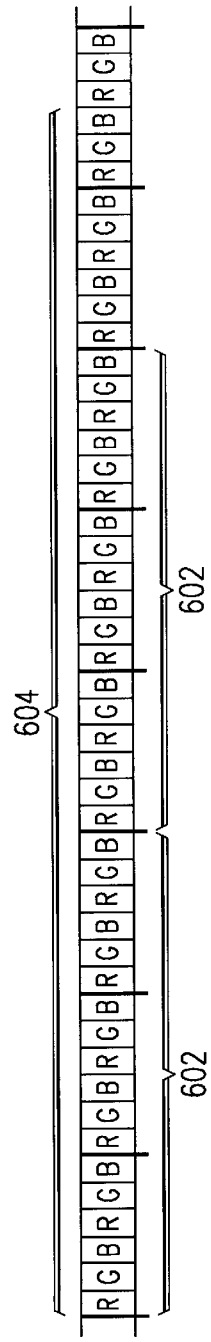
FIG. 6 is a timeline showing the relationship between a 24 Hz frame sequence and a 60 Hz frame sequence using a common 180 Hz color wheel speed according to the present invention.

FIG. 5 is a timeline showing the sequence of sub-frames used to display 24 Hz, 30 Hz, and 60 Hz signals. FIGS. 5 and 6 assume the color wheel has two segments for each of the three primary colors, arranged as R,G,B,R,G,B. Thus, every revolution of the wheel produces two complete RGB sequences, or sub-frames 506. The numbers beneath the color sequence every six segments count the number of revolutions of the color wheel. In FIG. 5, the color wheel is spinning 120 Hz. Each 60 Hz image field 502 takes two revolutions of the color wheel. Each 24 Hz image field 504 requires five revolutions of the color wheel. Each 30 Hz image field, not shown, requires four revolutions.

At 60 Hz, only four sub-frames—or two color wheel revolutions—are used by the system represented in FIG. 5 to create an image. As mentioned above, color separation artifacts may be noticeable when less than 4.5 sub-frames are used each frame period. Therefore, the timeline shown in FIG. 5 may be prone to color separation artifacts. A faster color wheel speed may be necessary for some applications.

FIG. 6 is a timeline showing the sequence of sub-frames used to display 24 Hz, 30 Hz, and 60 Hz signals. In FIG. 6, the color wheel is spinning 180 Hz. Each 60 Hz image field 602 takes 3.0 revolutions of the color wheel, or six sub-frames. Each 30 Hz image field, not shown, requires six revolutions, or 12 sub-frames. Each 24 Hz image field 604 requires 7.5 revolutions of the color wheel, or 15 sub-frames. Many other color wheel speeds are conceivable.

The color wheel speed multiplied by the number of complete filter sets on the color wheel determines the sub-frame rate of the display system—where a sub-frame is a color sequence that occurs when a complete set of the color filters rotates through the light path. A color sequence may or may not include a clear or white segment on the color wheel as well as at least of segment for each of the primary colors, and may include more than one segment of a given color. For example, a sub-frame may be a blue, red, clear, red, green sequence of color filters.

Dividing the sub-frame rate by the frame rate of a given input signal yields the number of sub-frames in each frame of input data—which should be an integer. Dividing the number of sub-frames in each frame of input data by the number of complete filter sets on the wheel gives the number of rotations of the color wheel during a input frame period. Because the color wheel of FIG. 3 contains two complete sets of color filters, it can be rotated in increments of one-half revolution each frame, adding flexibility to the common color wheel speed system.

Thus, although there has been disclosed to this point a particular embodiment for a common color wheel speed system and method, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A display system comprising:
   a light source for producing a beam of white light along a first light path;
   a filter wheel on said first light path for filtering said beam of white light, said filter wheel having at least one set of primary colored filters thereon;
   a motor connected to said filter wheel for spinning said filter wheel at a nominal speed;
   a spatial light modulator on said first light path for receiving said filtered beam of light traveling along said first path and selectively modulating said filtered beam of light traveling along said first path to form an image; and
   a controller receiving an input video signal at a video frame rate and providing image data decoded from said input video signal to said spatial light modulator, said input video signal having one of at least two native frame rates, said controller detecting said native frame rate and converting said input video signal to said native frame rate when said native frame rate is not equal to said video frame rate and displaying said decoded image data at said native frame rate.

2. The display system of claim 1, said nominal speed being 120 revolutions per second.

3. The display system of claim 1, said filter wheel having two sets of filters.

4. The display system of claim 1, said controller operable to receive an input video signal having a 60 Hz native frame rate or a 24 Hz native frame rate.

5. The display system of claim 4, said color wheel rotating 2 revolutions per native frame period when said native frame rate is 60 Hz.

6. The display system of claim 4, said color wheel rotating 5 revolutions per native frame period when said native frame rate is 24 Hz.

7. The display system of claim 4, said controller further operable to receive an input video signal having a 30 Hz native frame rate, said color wheel rotating 4 revolutions per native frame period when said native frame rate is 30 Hz.

8. A method of operating a sequential color display system comprising the steps of:

spinning a color wheel at a nominal speed;

receiving an input video signal;

detecting a native frame rate of said input video signal;

converting said input video signal to said native frame rate; and displaying said input video signal at said native frame rate using said color wheel spinning at a nominal speed.

9. The method of claim 8, said step of receiving an input video signal comprising the step of receiving an input video signal having a 60 Hz native frame rate.

10. The method of claim 8, said step of receiving an input video signal comprising the step of receiving a input video signal having a 30 Hz native frame rate.

11. The method of claim 8, said step of receiving an input video signal comprising the step of receiving an input video signal having a 24 Hz native frame rate.

12. The method of claim 8, said step of spinning a color wheel comprising the step of spinning said color wheel at 120 Hz.

13. The method of claim 8, said step of spinning a color wheel comprising the step of spinning said color wheel at 180 Hz.

14. A display system comprising:

a filter wheel operable at a nominal rate and having at least one set of color filters;

a display operable to form an image bearing beam of light colored by said filter wheel; and a controller receiving an input video signal at a video frame rate and providing image data decoded from said input video signal to said display, said input video signal having a native frame rate less than said video frame rate, said controller detecting said native frame rate and providing said image data to said display at said native frame rate, wherein the number of said sets of color filters multiplied by said nominal rate, divided by said native rate is an integer.

15. The display system of claim 14, said nominal rate being 120 revolutions per second.

16. The display system of claim 14, said filter wheel having two sets of filters.

17. The display system of claim 14, said filter wheel having a clear segment.

18. The display system of claim 14, said filter wheel having a clear segment for each set of said color filters.

19. The display system of claim 14, said video frame rate being 60 Hz and said native frame rate being 24 Hz.

20. The display system of claim 14, said controller operable to receive said input video signals having a 60 Hz video frame rate and a native frame rates of 60 Hz, 30 Hz, and 24 Hz.

21. A method of operating a sequential color display system comprising the steps of:

spinning a color wheel having at least one set of color filters at a nominal rate;

receiving an input video signal at a video frame rate, said input video signal having a native frame rate less than said video frame rate;

converting said input video signal to a video stream at said native frame rate; and displaying said video stream at said native frame rate using said color wheel spinning at a nominal speed, wherein the number of said sets of color filters multiplied by said nominal rate, divided by said native rate is an integer.

* * * * *